United States Patent [19]

Agrawal

[11] 4,415,281
[45] Nov. 15, 1983

[54] HYDRODYNAMIC FLUID FILM BEARING

[75] Inventor: Giridhari L. Agrawal, Simsbury, Conn.

[73] Assignee: United Technologies Corporation, Hartford, Conn.

[21] Appl. No.: 324,315

[22] Filed: Nov. 23, 1981

[51] Int. Cl.³ .................. F16C 32/06; F16C 27/00
[52] U.S. Cl. .................. 384/103; 384/106; 384/215; 267/158
[58] Field of Search .......... 384/103, 119, 106, 202, 384/215, 398, 399, 123, 124, 105; 267/165, 158 X

[56] References Cited

U.S. PATENT DOCUMENTS

| | | | |
|---|---|---|---|
| 3,635,534 | 1/1972 | Barnett | 384/106 |
| 3,809,443 | 5/1974 | Cherubim | 308/9 |
| 4,082,375 | 4/1978 | Fortmann | 384/105 |
| 4,116,503 | 9/1978 | Licht | 384/123 |
| 4,133,585 | 1/1979 | Licht | 384/103 |
| 4,247,155 | 1/1981 | Fortmann | 384/124 |
| 4,295,689 | 10/1981 | Licht | 384/103 |
| 4,300,806 | 12/1981 | Heshmat | 384/103 |

*Primary Examiner*—Stuart S. Levy
*Assistant Examiner*—Thomas R. Hannon
*Attorney, Agent, or Firm*—John Swiatocha

[57] ABSTRACT

A hydrodynamic fluid film bearing including a stationary retaining member 15, a rotating member 20 and a foil element 25 therebetween includes a resilient backing member 45 adjacent the foil element. The resilient backing member has a bilinear spring constant associated therewith. At low bearing loading, the spring constant of the backing member is lower than at high loading. By this construction the bearing achieves enhanced damping with minimum power loss at all speeds of operation as well as improved load capacity, and resistance to rotating member excursions and instabilities due to shaft imbalances and other disturbances.

6 Claims, 4 Drawing Figures

HYDRODYNAMIC FLUID FILM BEARING

TECHNICAL FIELD

This invention relates generally to hydrodynamic fluid film bearings and more particularly to such bearings employing one or more foils to establish and maintain a fluid film within the bearing, and a resilient backing member accommodating deflections of the foil and excursions of the rotating portion of the bearing.

BACKGROUND ART

Recent efforts to improve high speed bearings such as those used in turbo-compressor units employed in modern air cycle machinery for aircraft cooling and ventilation, have led to the development of fluid film hydrodynamic bearings such as those disclosed and claimed in U.S. Pat. Nos. 4,082,375 and 4,247,155 to Fortmann and 4,116,503 and 4,133,585 to Licht, all assigned to the assignee of the present invention, and U.S. Pat. No. 3,635,534 to Barnett. Generally, the fluid film hydrodynamic bearings disclosed in the above named patents operate on the principle that a rotating member such as a shaft or thrust runner and an adjacent element such as a smooth foil or the like establish and maintain a pressurized fluid film layer therebetween, the fluid film layer, sometimes referred to as a fluid film wedge, providing lubricated support for the rotating member. Often, a spring or resilient backing member is disposed between the foil and a stationary member (otherwise referred to as a cartridge, retainer or base) to accommodate deflections of the foil due to pressurization thereof for maintenance of optimum film layer geometry, thus providing support for the rotating member and foils against bearing loading and imbalances such as whirl and the like. It will be appreciated by those skilled in the art that in providing overall support for the rotating member, the resilient backing member must be stiff enough to adequately resist shaft excursions due to normal loading and imbalances. However, such stiffness should not come at the expense of damping, stability, and bearing efficiency.

DISCLOSURE OF INVENTION

It is therefore a principal object of the present invention to provide an improved hydrodynamic fluid film bearing.

It is another object of the present invention to provide such a bearing with enhanced load capacity.

It is another object of the present invention to provide such a bearing with adequate damping of the rotary portion thereof.

It is another object of the present invention to provide such a bearing characterized by low power losses at all operating speeds.

It is another object of the present invention to provide such a bearing wherein the rotary member remains stable within the bearing at all operating speeds.

These and other objects which will become more apparent from the following detailed description taken in connection with the appended claims and accompanying drawings, are attained by the hydrodynamic fluid film bearing of the present invention which includes a stationary retaining member, a rotating member defining with the stationary member, a spacing, one or more foil elements disposed within the spacing, and a resilient backing member having a bilinear spring constant disposed between the foil element and stationary member for accommodating foil deflections due to the pressurization thereof and rotating member excursions during bearing operation. The resilient backing member has a first, lower spring constant for adequate damping with minimum power loss under all operating conditions. At deflections under conditions of high loading, the resilient backing member has a substantially higher spring constant for enhanced load capacity and improved resistance to rotating member excursions.

BEST MODE OF CARRYING OUT THE INVENTION

Figure 1:
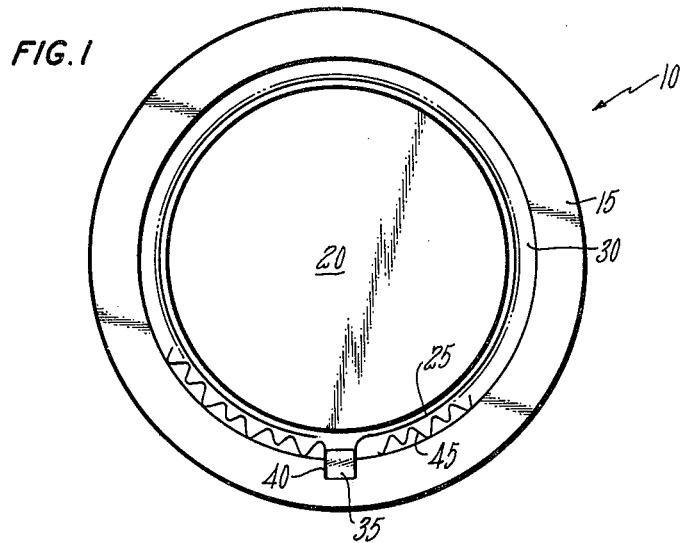
FIG. 1 is an end view of a hydrodynamic fluid film bearing employing the concepts of the present invention.

Referring to FIG. 1, in accordance with the present invention, a hydrodynamic fluid film journal bearing 10 includes a stationary member or cartridge 15 also known as a shell or retainer which encloses a rotary shaft or journal 20 adapted for connection to a high speed rotor for equipment such as high-speed electric motors or bladed rotors for use in any type of high-speed turbo-compressor such as those employed in air cycle machinery for cooling and pressurizing aircraft cabins. A smooth foil element 25 is disposed within spacing or clearance 30, the foil being generally cylindrical and fixed along an edge thereof to a side of key 35 slidably received within keyway 40 machined in retaining member 15. A longitudinally flexible, resilient backing member or spring 45 is disposed within clearance 30 between foil 25 and retaining member 15, the spring being generally of cylindrical shape and, as foil 25, fixed along its edge to key 35 on a face thereof opposite that to which the foil is fixed. This attachment of the foil and spring to key 35 provides ease in bearing manufacture and maintenance as well as facilitating removal of the foil and spring for replacement with foils and springs of differing properties for adjusting bearing properties such as load capacity, damping and the like.

Bearing 10 operates under the basic principle of the generation of hydrodynamic pressure in that portion of clearance 30 between journal 20 and foil 25. Under theoretical no load conditions, the geometric centers of journal 20, the cylinder formed by foil 25, and retaining member 15 all coincide. However, under actual operating conditions, there is always some load on journal 20 which eccentrically displaces the center of that member from the centers of foil 25 and retaining member 15 thereby defining with foil 25, a wedge shaped clearance. Rotation of the journal causes the geometric center of the journal to orbit about the geometric center of the foil causing the wedge shaped clearance to so orbit the foil center. The eccentric positioning of the shaft with respect to the foil and the continuous rotation of the shaft causes the establishment and maintenance of high and low pressure regions in the clearance, flow of fluid from the high pressure region to the low pressure region resulting in establishment of a fluid film which supports the journal, preventing contact between the journal and the foil.

The spring serves basically two purposes. It provides a resilient, deformable backing which aids in the formation of the supporting fluid film described hereinabove by accommodating certain foil deflections due to the pressurization thereof by the film. The spring also provides an overall bearing resilience and load carrying capacity including an accommodation of journal excursions due to loading and imbalances thereof. These two requirements generally inconsistent for a spring of a single spring rate. For example, in order to provide sufficient damping within accommodation of foil deflection and formation of fluid wedges, the spring requires a relatively low spring rate. To provide adequate load capacity and to adequately limit excursions of the rotating member, the spring is required to possess a relatively high spring rate. However, such a high spring rate militates against adequate damping and therefore, accentuates rotating member instabilities. In addition, such a high spring rate tends to inhibit foil deflections under pressure and therefore provides extremely small film clearances between the rotating member and foil. Such small clearances enhance the shear stress within the fluid thereby contributing to inherent power losses associated with the bearing.

Accordingly, it is seen that for damping and stability the spring should have a relatively low characteristic spring rate, while for adequate load capacity and limitation of shaft excursions, the spring should have a relatively high spring rate. In the bearing of the present invention a dual or bilinear spring rate is accomplished with a single spring.

Figure 2:
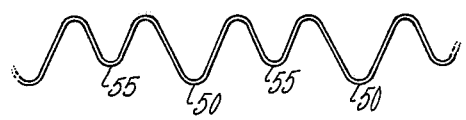
FIG. 2 is a side elevation of a resilient backing member employed in the bearing of the present invention.

Referring to FIGS. 1 and 2, spring 45 is of a periodic shape comprising first and second series of corrugations, the first series of corrugations 50 having a first (lower) spring rate associated therewith and the second series of corrugations 55 having, with first corrugation 50 a second (higher) spring rate. As best seen in FIG. 1, each of the second series of corrugations is disposed between a pair of first corrugations which contact stationary member 15. The amplitude of the second corrugations (distance from the apex of the corrugation to an axis extending through the center of the spring) is substantially less than that of the first corrugations. Thus, it can be seen that at low radial loading, deformation of the spring takes place solely at the first corrugations, the second corrugations engaging neither the stationary member nor the foil. Deflection of the foil causes ready deformation of the spring for enhanced fluid film definition as well as high damping and rotating member stability. However, under conditions of high radial loading, the spring is deformed to an extent that both the first and second corrugations engage the stationary bearing member. This causes a marked increase in the spring rate for limiting shaft excursions due to loading and resistance to instabilities such as whirl and the like.

Figure 3:
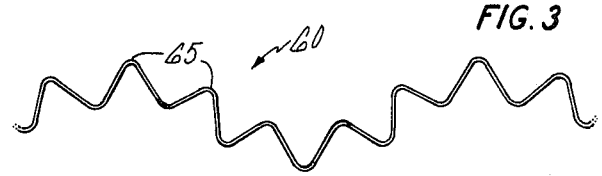
FIG. 3 is a side elevation of an alternate embodiment of a resilient backing member employed in the bearing of the present invention.

Referring to FIG. 3, each first corrugation 60 may comprise an elongate series of second corrugations 65. In other words, the spring is defined by the superposition of a first periodic wave train defining the second corrugations on a second periodic wave train defining the first corrugations where the first wave train is of substantially greater frequency than the second wave train. The spring of FIG. 3 functions similarly to that of FIG. 1 in that at low loading, the apices of first corrugations 60 contact the foil and stationary retaining member and thus under such low load conditions, the relatively low spring rate associated with the first corrugations facilitating deformation of the spring for enhanced fluid wedge formation, damping and rotating member stability. However, as loading increases, the spring deforms such that all of the second corrugations contact the foil and stationary retaining member thereby substantially stiffening the spring for enhanced load capacity and resistance to shaft excursions.

Figure 4:
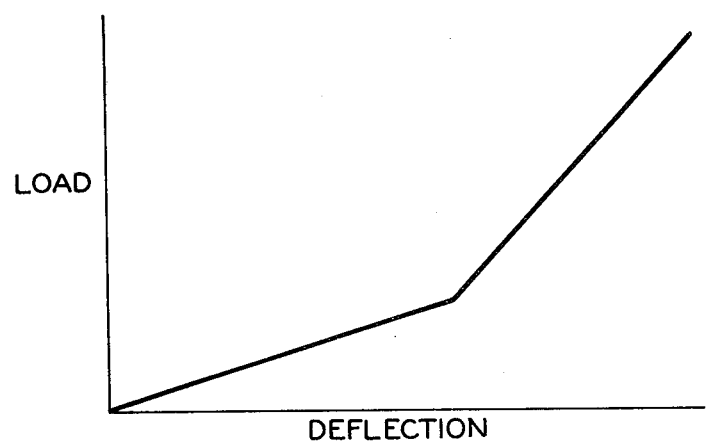
FIG. 4 is a graphical representation of a bilinear spring rate associated with the resilient backing members of FIGS. 2 and 3.

The bilinear spring rate associated with the springs shown in FIGS. 2 and 3 is graphically illustrated in FIG. 4. It is seen from FIG. 4 that as load on the spring increases due to for example, increasing loading of the rotating member, the spring rate (slope of the curve) remains relatively constant up to the break in the curve where the spring rate increases substantially. It is at this point that the spring has been deformed to the extent that the second (stiffer) corrugations contact one or both of the foil and stationary member thereby stiffening the spring.

While the hydrodynamic fluid film bearing of the present invention has been shown as employing a split cylindrical foil, it will be appreciated that any suitable foil shape as determined by requirements of load capacity, coulomb damping and fluid film geometry may be employed. By way of example, multiple radially spaced foils or a single coiled foil may be employed. Likewise, such requirements will determine the composition and dimensions of the foils and springs. For example, for a 7.62 cm. diameter bearing employed in a 50,000–100,000 RPM turbo-compressor for an air cycle refrigeration machine, it has been found that Inconel ® type Nickel alloy is well suited for foil 25 and spring 45. In this applications, each of these members is of a thickness in the range of 0.00762–0.0152 cm. (0.003–0.006 in.).

Accordingly, it is seen that the hydrodynamic fluid film bearing of the present invention operates optimally at all radial or side loads and at all speeds with a single resilient backing member having a bilinear spring rate. Thus, the bearing of the present invention is characterized not only by enhanced damping and stability with minimum power loss but enhanced load capacity and resistance to shaft excursions from imbalances and other disturbances.

Having thus described the invention what is claimed is:

1. A hydrodynamic fluid film bearing comprising a stationary retaining member, a rotating member defining with said retaining member a spacing therebetween, a smooth foil element disposed within said spacing, said rotating member being supported on a pressurized fluid film layer maintained by the relative movement between said rotating member and said foil element, said fluid bearing further comprising a single resilient backing member accommodating deflections of said foil elements due to the pressurization thereof by said fluid film layer, said bearing being characterized by:

said single resilient backing member being of one piece unitary structure and having a bilinear spring rate including a first, lower spring rate for accommodating deflections of said foil element and excursions of said rotating member from lesser relative loading thereof for enhanced stability and damping, and minimal power loss and a second, higher spring rate for resisting deflections of said foil element and excursions of said rotating member from greater relative loading thereof for enhanced load capacity.

2. The hydrodynamic fluid film bearing of claim 1 further characterized by said single resilient backing member having a periodic shape comprising a single serial array of a first series of resilient corrugations having said first spring rate associated therewith and a second series of resilient corrugations having with said first series of corrugations, said second spring rate associated therewith, said single resilient backing member being retained between said foil insert and stationary members by engagement therewith at said first corrugations at said lesser relative loading and by engagement with said foil insert and stationary members at said first and second corrugations at said greater relative loading.

3. The hydrodynamic fluid bearing of claim 2 further characterized by each of said first corrugations comprising an elongate series of said second corrugations.

4. The hydrodynamic fluid bearing of claim 3 further characterized by said single resilient backing member being of a shape defined by the superposition of a first periodic wave train defining said second corrugations on a second periodic wave train defining said first corrugations, said first wave train being of substantially greater frequency than said second wave train.

5. The hydrodynamic fluid bearing of claim 2 further characterized by each of said second corrugations being disposed between a pair of first corrugations contacting one of said foil insert and stationary retaining member.

6. The hydrodynamic fluid bearing of claim 5 wherein the amplitude of said second corrugations is less than the amplitude of said first corrugations.

* * * * *